Patented June 6, 1950

2,510,876

UNITED STATES PATENT OFFICE 2,510,876

RECOVERY OF 2,4-LUTIDINE AND 2,3-LUTIDINE

Karl Henry Engel, Teaneck, N. J., assignor to Allied Chemical & Dye Corporation, New York, N. Y., a corporation of New York No Drawing. Application February 16, 1946,
Serial No. 648,210

6 Claims. (Cl. 260—290)

This invention relates to the separation of 2,4-lutidine from mixtures of this base with other nitrogen bases.

Pyridine homologs such as the picolines, lutidines and collidines are customarily extracted along with other nitrogen bases from coke oven distillates and other sources of heterocyclic nitrogen bases by means of an aqueous solution of a mineral acid, usually sulfuric acid. After liberation of the bases from these acid solutions by means of alkali, the base mixtures obtained are customarily fractionally distilled to obtain fractions predominating in a particular base. Pyridine itself, boiling point 116° C., can generally be obtained in reasonably pure form by fractional distillation; the distillate cuts containing the progressively higher homologs of pyridine, however, consist of increasingly complex mixtures that cannot be resolved by distillation methods alone. Even narrow boiling distillation cuts among pyridine homologs such at the lutidines (dimethyl pyridines) are mixtures of two or more bases, each present in substantial amount; such mixtures are of limited practical application and, accordingly, of relatively low economic value.

Consideration of the relative boiling points of the lutidines generally found in commercial tar base fractions will make it evident that resolution of such mixtures would not generally be possible by ordinary fractional distillation. Tar base fractions containing predominating amounts of 2,4-lutidine will generally boil within the broad range 150° to 165° C. and will generally contain, besides 2,4-lutidine, 2,3-lutidine and homologous and isomeric bases such as 2,5-lutidine and 3,4-lutidine. Even a close-cut fraction, boiling, for example, in the range 156° to 163° C., will contain substantial amounts of 2,3-lutidine and other bases. Of these bases, 2,4-lutidine boils at 158.6° C., 2,5-lutidine at 159°–160° C., 2,3-lutidine at 161.4° C., and 3,4-lutidine at 163.5°–164.5° C. Many of these individual lutidines, particularly 2,4-lutidine, if isolated in reasonably pure form would be products of considerable commercial interest, being useful in the preparation of derivatives, for example, pharmaceutical products and dyes; the purity requirements in these fields may be quite rigid.

No description of a practical method for separating these lutidines, specifically for separating the predominant 2,4-lutidine from admixtures with the 2,3-lutidine with which it is generally found in tar base fractions, has been found in the published prior art. In the case of various base mixtures, methods usually depending upon fractional crystallization of the less common salts of the bases present, e. g. picrates, ferricyanides, platinichlorides, etc., or methods depending on an impractical fractional distillation of base hydrochlorides, have been proposed. No suggestion has been found, however, of a practical, effective method for separating reasonably pure 2,4-lutidine from 2,3-lutidine and other like-boiling bases.

It is an object of this invention to provide a commercially feasible and economical method for separating 2,4-lutidine from mixtures thereof with 2,3-lutidine and other closely related nitrogen bases not readily separable from the 2,4-lutidine by distillation.

It is a further object of this invention to provide a process for isolating substantially pure 2,4-lutidine or fractions enriched in 2,4-lutidine from the usual commercial 2,4-lutidine fractions in which 2,3-lutidine and like-boiling bases are in admixture with the 2,4-lutidine, particularly from tar base fractions boiling predominantly in the range of about 156° to 163° C.

I have discovered that 2,4-lutidine of 94%–97% purity may be precipitated in the form of its hydrochloride from mixtures of 2,4-lutidine with 2,3-lutidine and other nitrogen bases not readily separable from 2,4-lutidine by distillation, provided the weight ratio of 2,4-lutidine to 2,3-lutidine in the mixture exceeds 2:3, preferably is at least 1:1, by treating such a base mixture in a substantially anhydrous medium with a limited amount of hydrogen chloride or equivalent reagent for the formation of base hydrochloride.

The preferential precipitation of 2,4-lutidine hydrochloride to the substantial exclusion of other base hydrochlorides, even when the 2,4-lutidine is not the predominant base in the mixture, sets 2,4-lutidine apart from such closely related bases as 2,3-lutidine and 2,5-lutidine. This preferential precipitation also distinguishes hydrogen chloride from similar salt-forming reagents such as sulfuric acid, which I have found is ineffective to precipitate a base such as 2,4-lutidine selectively. The reasons for the preferential precipitation of 2,4-lutidine hydrochloride are not fully understood, but appear to depend on phase rule relations which are unpredictable and which in the case of the base mixtures involved are extremely complex due to the number of components present in the mixtures. The relative basicity of the bases is not a factor as indicated by the fact that the various bases of the mixture do not appear in the hydrochloride precipitate in amounts to be expected from the well-known distribution laws.

A suitable 2,4-lutidine crude for use in the process of my invention may advantageously be obtained by fractional distillation of the 2,4-lutidine-containing base mixtures recovered from the usual sources of such mixtures, for example, coal tar. It has been found that suitable 2,4-lutidine mixtures for precipitation of an enriched 2,4-lutidine product in the form of its hydrochloride boil for the most part predominantly in the range 150° to 165° C. and contain from 25% to 70% by weight of 2,4-lutidine, from 15% to 25% of 2,3-lutidine, the remainder consisting of close-boiling isomers and homologs. A close-boiling fraction of boiling range 156° to 162° C. containing from about 60% to 70% 2,4-lutidine and no more than about 25% 2,3-lutidine is the preferred material for use in the process of my invention.

Another feature of my process for precipitating the base hydrochlorides from mixtures of 2,4-lutidine, 2,3-lutidine and close-boiling bases, is the precipitation of a 2,3-lutidine-enriched eutectic mixture from a base mixture of suitable base concentration characteristics. I have found that a 2,3-lutidine-enriched mixture, specifically a eutectic containing about 60% 2,3-lutidine and 40% 2,4-lutidine, precipitates preferentially from a mixture containing 2,3-lutidine, 2,4-lutidine and closely related bases provided the weight ratio of 2,3-lutidine to 2,4-lutidine exceeds 3:2 and preferably 2:1. Such a mixture suitable for precipitation of a 2,3-lutidine-enriched fraction may, for example, be the residual unreacted base mixture left after precipitation of 2,4-lutidine as hydrochloride, as above described. The 2,3-lutidine-enriched fraction thus obtained by hydrochloride precipitation is advantageous as a source of 2,3-lutidine, a substantial part of the 2,3-lutidine being readily separated from such a mixture by precipitation thereof as 2,3-lutidine phosphate. Alternatively, a somewhat smaller yield of 2,3-lutidine phosphate may be obtained by treating the residual unreacted base mixture from 2,4-lutidine hydrochloride precipitation directly with a phosphoric acid reagent for precipitation of base phosphate.

The liquid medium for carrying out precipitation of the 2,4-lutidine hydrochloride or the 2,3-lutidine-enriched hydrochloride may be merely the non-reacting tar bases in the mixture being treated or may be such tar bases augmented by an added diluent which is an inert liquid having low solvent power for the base hydrochloride. The most suitable diluents are hydrocarbon or halogenated hydrocarbon solvents. The precipitation should be carried out in the absence of liquids such as water, alcohols (e. g. methanol, ethanol and propanol), and dioxanes. As pointed out below, when water is introduced into the reaction mixture, for example with the reactants, it should be removed, e. g. by azeotropic distillation as more fully described below, in order to bring about precipitation of the desired base hydrochloride.

In a preferred method of carrying out the principal process of my invention, i. e. the precipitation of enriched or pure 2,4-lutidine, a commercial 2,4-lutidine fraction as above described is treated either with gaseous hydrogen chloride or with aqueous hydrochloric acid, which may advantageously be the inexpensive and readily available technical grade of muriatic acid. This treatment is preferably carried out in the presence of a hydrocarbon diluent as above discussed, e. g. benzene, toluene, xylene, a petroleum naphtha, or a naphthene such as cyclohexane or methylated cyclohexanes.

In order to obtain an anhydrous crystallization medium when an aqueous hydrochloric acid is employed, the mixture is heated to refluxing temperature to remove the water by azeotropic distillation, the free nitrogen base and added diluent, if present, acting as azeotropic agent. The distillate is condensed in a sidearm trap where it separates into a water layer and an oil layer. The water layer is removed while the oil layer containing unreacted base and diluent, when such has been used, is continuously returned to the still. When all or nearly all of the water has thus been removed, the still charge is cooled to bring about or to complete crystallization of 2,4-lutidine hydrochloride. In general, the desired base hydrochloride precipitate may be formed at the normally prevailing temperature; i. e. cooling below room temperature is not usually necessary.

As above stated, an amount of hydrogen chloride or hydrochloric acid sufficient to react with less than the total amount of 2,4-lutidine present is employed. For example, when 2,4-lutidine of about 94% to 97% purity is desired, the amount of hydrogen chloride reagent to be used when operating upon my preferred raw material, i. e. a fraction boiling within the range 156° to 162° C. and containing between about 60% and about 70% of 2,4-lutidine and not more than about 25% of 2,3-lutidine is limited to the amount theoretically required to form the hydrochloride of an amount of nitrogen base equal to the 2,4-lutidine present minus the 2,3-lutidine present. Should an enriched 2,4-lutidine product be satisfactory containing, for example, from about 70% to 94% 2,4-lutidine, a somewhat larger amount of hydrogen chloride reagent may be employed, sufficient in theory to react with an amount of nitrogen base equal to the 2,4-lutidine present minus one-half the 2,3-lutidine.

The precipitated nitrogen base hydrochloride crystals are isolated by filtration, e. g. centrifuging, and are freed from adhering unreacted bases by washing with a suitable solvent, e. g. the solvent used as diluent for the precipitation. The crystals are then freed from adhering solvent by drying or other means. The base is liberated from the crystalline hydrochloride thus obtained, for example, by adding alkali to an aqueous solution of the base hydrochloride. The liberated base, which separates out from the resulting salt solution, is dehydrated, for example, by treating with solid caustic soda, and is preferably distilled to remove traces of colored impurities.

The mother and wash liquors may be distilled to recover solvent for reuse in the process and the residual tar bases may then be refractionated to produce fractions rich in other bases, or may be employed directly either for precipitation of a 2,3-lutidine-enriched product as hydrochloride or a smaller amount of substantially pure 2,3-lutidine as phosphate, as above described.

The preferred method for precipitation of a hydrochloride of a 2,3-lutidine-enriched product and recovery of the free base therefrom, is the same as the preferred 2,4-lutidine recovery process above described.

The 94% to 97% pure 2,4-lutidine product which, as above pointed out, may be obtained in the process of my invention, is acceptable in commerce as substantially pure 2,4-lutidine. If a 100% pure material is desired, however, this may be obtained by treating either the 94% to 97% 2,4-lutidine or the 70% to 94% material with phosphoric acid to precipitate and separate 100% pure 2,4-lutidine phosphate.

The following examples are illustrative of the process of my invention:

*Example 1.*—A mixture of heterocyclic nitrogen bases of coal tar origin containing about 65% by weight of 2,4-lutidine, about 20% by weight of 2,3-lutidine, and about 15% by weight of like-boiling isomers and homologs was employed. The specific gravity of this material was 0.926 at 25° C. and its boiling range was as follows:

| Volume Percent Distilled | Bulb Distillation Temperature, ° C. |
|---|---|
| Start | 145.0 |
| 10 | 157.9 |
| 20 | 158.5 |
| 50 | 158.7 |
| 80 | 159.0 |
| 90 | 159.5 |
| 95 (Dry) | 161.5 |

The apparatus used consisted of an acid-resistant reaction vessel equipped with agitator, a jacket suitable for heating with steam or for cooling with circulating tap water, and a reflux condenser. Provision was made for passing distillation condensate through a settling trap which permitted a separation of mixed distillate consisting of aqueous and oil layers. The trap was arranged for withdrawal of the aqueous layer and return of the oil layer to the reaction vessel.

The reaction vessel was charged with 1000 parts by weight of the above-described crude 2,4-lutidine fraction, 335 parts by weight of 33.5% hydrochloric acid and 70 parts by weight of a petroleum naphtha of approximate boiling range 95° to 135° C. The charge was heated to refluxing and entrained water was taken off intermittently through the side-arm trap with return of the oil layer to the still. A total of 225 parts by weight of water was taken off.

2,4-lutidine hydrochloride began to separate toward the end of the dehydration, precipitating in coarse crystals of fairly uniform grain. After cooling to room temperature the crystals were filtered by suction and washed with 350 parts by weight of the petroleum naphtha. After drying at 90° C. to remove solvent, the 453 parts by weight of 2,4-lutidine hydrochloride crystals obtained had a melting point of 215° C., corresponding to a purity of about 97%.

These crystals were dissolved in about 600 parts by weight of water, and about 150 parts by weight of this water were then evaporated off as a means of steam distilling off traces of distillable impurities. The solution was cooled and neutralized with 140 parts by weight of sodium hydroxide in about 150 parts by weight of water, 2,4-lutidine separating readily as a clear upper layer. Water volumes were chosen so as to obtain a practically saturated sodium chloride solution to reduce solubility of the base in aqueous solution. (If separation of base and salt solution is carried out while they are still warm, loss of base through solubility becomes negligible for practical purposes.) The free base was freed from dissolved water by addition of sodium hydroxide chips and distilled. The yield was 332 parts by weight of free base. The base had the correct boiling point of 2,4-lutidine; namely, 158.5° to 158.8° C. corrected, at 760 mm. Its specific gravity (25°/25° C.) was 0.9292; refractive index ($n_D$ at 25° C.) was 1.4993. The material did not solidify above —70° C.

*Example 2.*—The mother liquor from the first crop of crystals was returned to the reflux distillation vessel. The petroleum solvent used for washing the crystals was extracted completely for dissolved bases with 240 parts by weight concentrated (35.5%) hydrochloric acid and the extract added to the charge. The mixture was dehydrated as before, 160 parts of water being taken off through the trap.

Uniformly granular crystals were filtered and washed with petroleum solvent as before. The yield of crystals was 302 parts by weight, melting point 205° C., corresponding to a purity of about 83% 2,4-lutidine hydrochloride.

*Example 3.*—A mixture of residual unreacted bases resulting from precipitation of 2,4-lutidine hydrochloride to the point where 2,4-lutidine hydrochloride of about 83% purity was precipitated, as described in the two preceding examples, from an original base mixture such as that described in Example 1, was employed as a source of 2,3-lutidine. This 2,3-lutidine source contained about 40% 2,3-lutidine, about 25% 2,4-lutidine, and about 35% isomeric and homologous bases.

To 1100 parts by weight of such a mixture mixed with 700 parts by weight of the petroleum solvent above described, were added 230 parts by weight of anhydrous hydrogen chloride. A yield of 885 parts by weight of base hydrochloride crystals were obtained. These crystals had a melting point of 145° to 146° C. and were made up of about 60% 2,3-lutidine hydrochloride and about 40% 2,4-lutidine hydrochloride.

The bases were liberated from such crystals with sodium hydroxide in the usual way, a yield of 630 parts by weight being obtained; the boiling range of these bases was 159° to 160° C.

200 parts by weight of this base mixture, 150 parts by weight of 85% phosphoric acid and 200 parts by weight of methanol were mixed, agitated and cooled to room temperature. A crop of fine crystals precipitated and were filtered by suction, washed with methanol and dried. The yield was 150 parts by weight.

Decomposition with sodium hydroxide gave 76 parts by weight of distilled free base. Its boiling range was 160.4° to 160.6° C. corrected; refractive index $n_D$ at 25° C. 1.5052; its melting point —17.9° C. This product was found to be substantially pure 2,3-lutidine.

Since certain changes may be made in carrying out the above process without departing from the scope of the invention, it is intended that all matter contained in the above description shall be interpreted as illustrative and not in a limiting sense.

The term "hydrogen chloride" is used in the claims to include both anhydrous hydrogen chloride and aqueous hydrochloric acid.

I claim:

1. In a process for separating an enriched 2,4-lutidine product from a mixture of 2,4-lutidine with like-boiling nitrogen bases including 2,3-lutidine in which the weight ratio of 2,4-lutidine to 2,3-lutidine exceeds 2:3, the steps that comprise treating the mixture in an anhydrous medium with hydrogen chloride in amount sufficient to react with less than the total amount of 2,4-lutidine present to precipitate 2,4-lutidine hydrochloride preferentially to other nitrogen base hydrochlorides, and separating this precipitate.

2. In a process for separating an enriched 2,4-lutidine product from a mixture of 2,4-lutidine with like-boiling nitrogen bases including 2,3- lutidine in which the weight ratio of 2,4-lutidine to 2,3-lutidine exceeds 2:3, said mixture boiling predominantly within the range 150° to 165° C., the steps that comprise treating the mixture in an anhydrous medium with hydrogen chloride in amount sufficient to react with less than the total amount of 2,4-lutidine present to precipitate 2,4-lutidine hydrochloride preferentially to other nitrogen base hydrochlorides, separating this precipitate, and treating it to liberate a base enriched in 2,4-lutidine.

3. In a process for separating substantially pure 2,4-lutidine product from a mixture of 2,4-lutidine with like-boiling nitrogen bases including 2,3-lutidine boiling within the range 156° C. to 162° C. and containing from about 60% to about 70% of 2,4-lutidine and not more than about 25% of 2,3-lutidine, the steps that comprise treating the mixture in an anhydrous medium and in the absence of alcohols, with hydrogen chloride in amount not greater than that required in theory to react with an amount of nitrogen base equivalent to the quantity of 2,4-lutidine present minus the 2,3-lutidine present, to precipitate substantially pure 2,4-lutidine hydrochloride preferentially to other nitrogen base hydrochlorides, separating this precipitate, and treating it with alkali to liberate substantially pure 2,4-lutidine therefrom.

4. In a process for separating substantially pure 2,4-lutidine and 2,3-lutidine from a mixture thereof with like-boiling nitrogen bases in which the weight ratio of 2,4-lutidine to 2,3-lutidine exceeds 2:3, the steps that comprise treating the mixture in an anhydrous medium and in the absence of alcohols, with hydrogen chloride in amount sufficient to react with less than the total amount of 2,4-lutidine present to precipitate a nitrogen base hydrochloride in which 2,4-lutidine predominates over 2,3-lutidine hydrochloride, separating said precipitate, treating the residual unreacted base with additional hydrogen chloride to precipitate a mixture of 2,3-lutidine and 2,4-lutidine hydrochlorides predominating in 2,3-lutidine hydrochloride, separating the latter precipitate, treating it with alkali to set free the base, treating the resulting base with phosphoric acid to precipitate substantially pure 2,3-lutidine phosphate, and separating this last precipitate.

5. In a process for separating an enriched 2,4-lutidine product from a substantially anhydrous mixture of 2,4-lutidine with like-boiling nitrogen bases including 2,3-lutidine, in which the weight ratio of 2,4-lutidine to 2,3-lutidine exceeds 2:3, the steps that comprise adding to the mixture, substantially anhydrous hydrogen chloride in an amount sufficient to react with less than the total amount of 2,4-lutidine present to precipitate 2,4-lutidine hydrochloride preferentially to other nitrogen base hydrochlorides while maintaining the mixture under substantially anhydrous conditions, to form a precipitate of an enriched 2,4-lutidine product, and separating this precipitate.

6. In a process for separating an enriched 2,4-lutidine product from a mixture of 2,4-lutidine with like-boiling nitrogen bases including 2,3-lutidine, in which the weight ratio of 2,4-lutidine to 2,3-lutidine exceeds 2:3, the steps that comprise adding to the mixture an aqueous solution of hydrogen chloride in an amount sufficient to react with less than the total amount of 2,4-lutidine present to precipitate 2,4-lutidine hydrochloride preferentially to other nitrogen base hydrochlorides, refluxing the mixture to remove the water as a constant boiling mixture with the organic liquids present while returning the non-aqueous distillates to the still, until the remaining mixture is substantially free of water, whereupon a precipitate of an enriched 2,4-lutidine product is formed, and separating this precipitate.

KARL HENRY ENGEL.

REFERENCES CITED

The following references are of record in the file of this patent:

UNITED STATES PATENTS

| Number | Name | Date |
| --- | --- | --- |
| 2,336,502 | Reimers | Dec. 14, 1943 |
| 2,456,377 | Cislak | Dec. 14, 1948 |

Certificate of Correction

Patent No. 2,510,876 June 6, 1950

KARL HENRY ENGEL

It is hereby certified that errors appear in the printed specification of the above numbered patent requiring correction as follows:

Column 1, line 21, for the words "such at" read *such as*; column 5, line 35, for "33.5%" read *35.5%*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*